United States Patent
Nicolai et al.

(10) Patent No.: US 6,744,363 B1
(45) Date of Patent: Jun. 1, 2004

(54) SWITCHGEAR CABINET MONITORING ARRANGEMENT

(75) Inventors: Walter Nicolai, Buseck (DE); Heinrich Strackbein, Biebertal (DE); Jörg Kreiling, Biebertal (DE); Michael Seelbach, Freudenberg (DE); Markus Hain, Dillenburg (DE)

(73) Assignee: Rittal GmbH & Co. KG, Herborn (DE)

( * ) Notice: Subject to any disclaimer, the term of this patent is extended or adjusted under 35 U.S.C. 154(b) by 0 days.

(21) Appl. No.: 09/523,792

(22) Filed: Mar. 13, 2000

(30) Foreign Application Priority Data

Mar. 13, 1999 (DE) .......................................... 199 11 320

(51) Int. Cl.[7] .............................................. G08B 19/00
(52) U.S. Cl. ............................... 340/506; 700/79; 700/9
(58) Field of Search ................................ 700/9, 17, 79, 700/83; 340/506, 521, 825.06, 511

(56) References Cited

U.S. PATENT DOCUMENTS

| | | | | |
|---|---|---|---|---|
| 4,073,000 A | * | 2/1978 | Krejsa | 361/616 |
| 4,231,028 A | * | 10/1980 | Zulaski | 340/644 |
| 4,249,227 A | * | 2/1981 | Kato et al. | 361/622 |
| 5,424,500 A | * | 6/1995 | Smith | 202/50 |
| 5,661,627 A | * | 8/1997 | Liebetruth et al. | 361/115 |
| 5,805,813 A | * | 9/1998 | Schweitzer, III | 395/200.47 |
| 5,912,444 A | * | 6/1999 | Godesa | 200/50.01 |
| 6,041,851 A | * | 3/2000 | Diebel et al. | 165/104.33 |
| 6,053,018 A | * | 4/2000 | Ramsauer | 70/208 |
| 6,076,384 A | * | 6/2000 | Thielmann et al. | 70/210 |
| 6,088,219 A | * | 7/2000 | Yanniello et al. | 361/657 |
| 6,131,423 A | * | 10/2000 | Xenaki et al. | 70/158 |
| 6,141,192 A | * | 10/2000 | Garzon | 361/5 |
| 6,155,658 A | * | 12/2000 | Woodward et al. | 312/204 |
| 6,222,448 B1 | * | 4/2001 | Beck et al. | 340/506 |
| 6,285,157 B1 | * | 9/2001 | Hain et al. | 318/809 |
| 6,346,882 B1 | * | 2/2002 | Hain et al. | 340/521 |
| 6,348,745 B1 | * | 2/2002 | Laurosch et al. | 307/112 |
| 6,442,452 B1 | * | 8/2002 | Kopke | 700/292 |
| 6,549,127 B1 | * | 4/2003 | Strackbein et al. | 340/506 |

FOREIGN PATENT DOCUMENTS

DE 196 09 689 9/1997

* cited by examiner

Primary Examiner—Ramesh Patel
Assistant Examiner—Ronald D Hartman, Jr.
(74) Attorney, Agent, or Firm—Pauley Petersen & Erickson

(57) ABSTRACT

A switchgear cabinet monitoring arrangement with a control device for monitoring switchgear cabinet functions, including a door position, and for generating monitoring signals for signaling to and/or controlling components relating to the switchgear cabinet functions and installed in the switchgear cabinet or on the switchgear cabinet. A simple and compact design is achieved because the control device is limited to monitoring preselectable threshold values, a door position switch is installed on or in the device housing, and the device housing has one or several indicator elements which react with a visual or acoustic indication when at least one threshold value is upwardly or downwardly exceeded.

14 Claims, 1 Drawing Sheet

SWITCHGEAR CABINET MONITORING ARRANGEMENT

BACKGROUND OF THE INVENTION

1. Field of the Invention

This invention relates to a switchgear cabinet monitoring arrangement with a control device for monitoring switchgear cabinet functions, including a door position, and for the generation of monitoring signals for signaling to and/or controlling components relating to the switchgear cabinet functions and installed in the switchgear cabinet or on the switchgear cabinet.

2. Description of Prior Art

A switchgear cabinet monitoring arrangement of this type is disclosed in German Patent Reference DE 196 09 689 A1. This known switchgear cabinet monitoring arrangement is matched to various uses of the switchgear cabinet and has versatile sensor devices for different measured values, such as temperature, closing status of the door, vibrations, smoke development and humidity, as well as with actuators, by which it is possible to react to sensor signals. With control and regulation options, there is a design of the switchgear cabinet for a multitude of uses, for which the control device with the signal processing and evaluation units is elaborately designed.

SUMMARY OF THE INVENTION

One object of this invention is to provide a switchgear cabinet monitoring arrangement, which requires little space, that can be simply assembled and can also retrofitted.

This object achieved with a switchgear monitoring arrangement as described in this specification and in the claims. A control device is limited to monitoring preselectable threshold values. A door position switch is installed on the device housing or installed in it, and the device housing has one or several indicator elements which react with a visual or acoustic indication when at least one threshold value is upwardly or downwardly exceeded.

With the limitation of the control device to monitoring preselectable threshold values and to the corresponding indicator elements, as well as the arrangement of a door position switch on the device housing, it is possible to keep the switchgear cabinet monitoring arrangement comparatively small and simple in construction. It therefore requires little space and can easily be housed without problems in the switchgear cabinet, even at a later time. The door position switch can be actuated directly with the door or indirectly with intermediate elements. Through the monitoring signals it is possible to control, or respectively regulate, suitable units installed in or on the switchgear cabinet via a more elaborate further control device arranged outside of the device housing.

An advantageous structure results because the door position switch installed in the device housing projects beyond an associated housing wall with only a slideable or pivotal switch element. Thus the door position switch is housed in a protected manner, and its connecting contacts for receiving the monitoring signals are placed into the interior of the device housing.

The steps, wherein the door position switch is housed in one housing section and the control device in a further housing section placed on top of the first, contribute to a simple, well arranged structure. A separation essentially into an electrical section with the control device and an indicator, and a mechanical section with the installed door position switch, thus results. In this case the electrical section can be maintained, or respectively exchanged, essentially independently of the mechanical section.

Each monitoring state can be assigned its own indicator element. Alternatively, in a suitable design at least one indicator element displays at least two of the different monitoring states. The threshold value is upwardly or downwardly exceeded, a normal function and a critical state, and at least one common indicator element is used for monitoring signals obtained from different sensors.

The dependability of monitoring is enhanced because the indicator state showing that a threshold value is upwardly or downwardly exceeded is maintained until an operator resets.

If the threshold values are stored in a fixed value memory of the control device and are changed by keys arranged on the device housing, or via a connecting line from a remote position, or by means of radio, then the threshold values can be made available in a simple manner and can also be changed.

The monitoring options and operating options are increased because the monitoring signals can be transmitted via a connecting line or via radio to a location outside of the switchgear cabinet, and because several switchgear cabinet monitoring arrangements are connected to a net and are linked to a higher monitoring position.

By means of these steps a switchgear cabinet monitoring arrangement is made available, which is not elaborate and is cost-effective.

BRIEF DESCRIPTION OF THE DRAWINGS

This invention will be explained in greater detail by an exemplary embodiment, making reference to the drawings, wherein.

DESCRIPTION OF PREFERRED EMBODIMENTS

Figure 1:
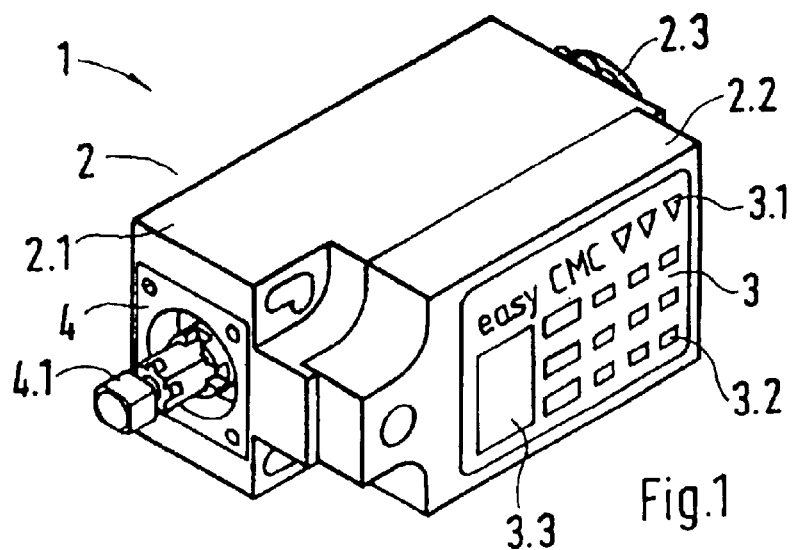
FIG. 1 is a perspective plan view of a switchgear cabinet monitoring arrangement.

A switchgear cabinet monitoring arrangement 1 represented in FIG. 1 has an essentially cube-shaped device housing 2 with a first housing section 2.1 and a further housing section 2.2 arranged flat on top of it, as well as a cover 2.3, which is arranged on a back and can be unscrewed. A plunger-like, slideable switching tongue 4.1 is arranged on the front and projects past the front wall of the device housing 2, and forms a part of a switch insert 4, which is housed in the interior of the device housing 2, namely in the first housing section 2.1. An operating and indicator field 3 with indicator elements 3.1, key elements and/or further indicator elements 3.2 and a reset key 3.3, is provided on the outside of the further housing section 2.2.

Figure 2:
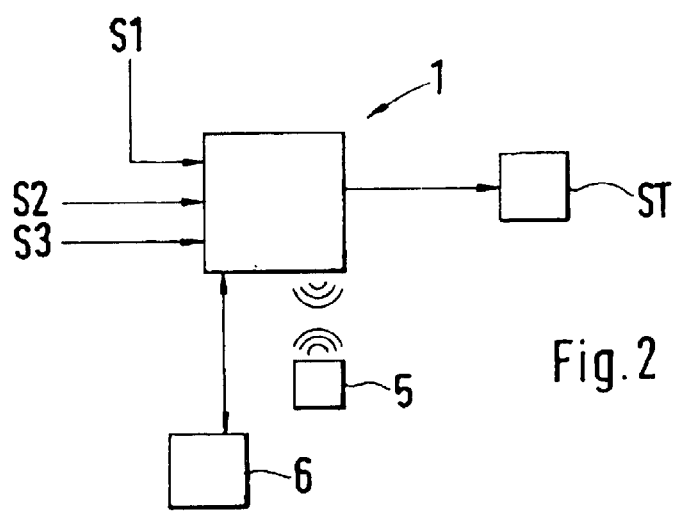
FIG. 2 is a block diagram of essential functions of the switchgear cabinet monitoring arrangement.
Figure 3:
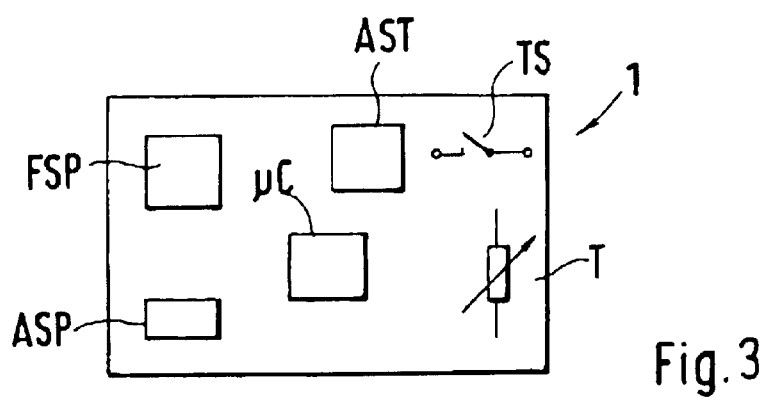
FIG. 3 is a block diagram with essential electronic components of the switchgear cabinet monitoring arrangement.

As shown in FIG. 2, the switchgear cabinet monitoring arrangement 1 is connected with various sensors S1, S2, S3, wherein signals are conducted to a control device, preferably housed in the further housing section 2.2, and having a micro-controller μC, a working memory ASP and a fixed value memory FSP, as shown in FIG. 3. Moreover, a radio operating device 5 and a further external operating device 6, which is connected by means of a line, as well as a further control device ST are shown in FIG. 2. By means of the radio operating device 5 and the external operating device 6 it is possible to receive data from the switchgear cabinet monitoring arrangement 1 at a location outside or inside the switchgear cabinet, and also to perform settings or simple programming operations from this location. With a further control device ST it is possible to act in a controlling or regulating way on devices installed in the switchgear cabinet or devices installed on the switchgear cabinet. The external operating devices 5 or 6 can be connected through a network, for example, to which further switchgear cabinet monitoring arrangements 1 can be connected.

Preselected threshold values are stored in a fixed value memory FSP shown in FIG. 3, with which the sensor signals provided via the sensors S1, S3 are compared. When the threshold values are exceeded upward and/or downward, an indicator control is activated for emitting an appropriate indicator signal to the indicator elements 3.1 to signal the abnormal state.

The signal is maintained until an operator resets the indicator with the reset key 3.3. In addition, the monitoring signals made available by the control device can be passed on to the radio operating device 5 and/or the external operating device 6. If desired, the threshold values can be changed by means of keys provided on the operating element and indicator field 3, or via the radio operating device 5 or the external operating device 6.

Temperature sensors, voltage sensors, admission sensors, operating hour counters, movement detectors and/or smoke detectors can, for example, be used as sensors S1, S2, S3. A door position switch TS, on which the switching tongue 4.1 is arranged for example, as well as a temperature sensor T, which can also be arranged in the device housing 2, are represented in FIG. 3.

A ventilator, a heater, an alarm, or the like, can for example be triggered by means of the further control device ST. An extensive linkage including many switchgear cabinet monitoring arrangements 1 can be provided via the radio operating device 5 or the external operating device 6, or respectively a network with further external operating devices, for example also by means of ISDN. In that case the compactly designed, simple and cost-effective switchgear cabinet monitoring arrangement 1 makes various expansions possible.

What is claimed is:

1. In a switchgear cabinet monitoring arrangement having a control device comprising a micro controller, a fixed value memory and a working memory for monitoring a plurality of switchgear cabinet functions, including a door position, wherein the control device generates monitoring signals for signaling to and/or controlling components relating to the switchgear cabinet functions, the control device being installed in the switchgear cabinet or on the switchgear cabinet, the improvement comprising:

the control device being limited to monitoring preselectable threshold values;

a door position switch installed on or in a device housing and projecting beyond an associated housing wall with either a slideable or a pivotal switch element; and the device housing having at least one indicator element which reacts with a visual indication and/or an acoustic indication when at least one threshold value is either upwardly or downwardly exceeded;

wherein the door position switch is housed in one housing section and the control device in a further housing section is placed on a top of the one housing section.

2. In the switchgear cabinet monitoring arrangement in accordance with claim 1, wherein the at least one indicator element displays at least two different monitoring states showing that the at least one threshold value is either upwardly or downwardly exceeded.

3. In the switchgear cabinet monitoring arrangement in accordance with claim 2, wherein a common indicator element of the at least one indicator element monitors signals obtained from different sensors.

4. In the switchgear cabinet monitoring arrangement in accordance with claim 3, wherein an indicator state showing that the at least one threshold value is either upwardly or downwardly exceeded is maintained until reset.

5. In the switchgear cabinet monitoring arrangement in accordance with claim 4, wherein the at least one threshold value is stored in the fixed value memory of the control device and each is changed by one of keys arranged on the device housing, by a connecting line from a remote position or by a radio.

6. In the switchgear cabinet monitoring arrangement in accordance with claim 5, wherein the monitoring signals are transmitted via either a connecting line or a radio to a location outside of the switchgear cabinet.

7. In the switchgear cabinet monitoring system in accordance with claim 6, wherein several switchgear cabinet monitoring arrangements are connected to a net and are linked to a higher monitoring position.

8. In a switchgear cabinet monitoring arrangement having a control device comprising a micro controller, a fixed value memory and a working memory for monitoring a plurality of switchgear cabinet functions, including a door position, wherein the control device generates monitoring signals for signaling to and/or controlling components relating to the switchgear cabinet functions, the control device being installed in the switchgear cabinet or on the switchgear cabinet, the improvement comprising:

the control device being limited to monitoring preselectable threshold values;

a door position switch installed either on or in a device housing; and the device housing having at least one indicator element which reacts with a visual indication and/or an acoustic indication when at least one threshold value is either upwardly or downwardly exceeded;

wherein the door position switch is housed in one housing section and the control device in a further housing section is placed on a top of the one housing section.

9. In the switchgear cabinet monitoring arrangement in accordance with claim 8, wherein the at least one indicator element displays at least two different monitoring states showing that the at least one threshold value is either upwardly or downwardly exceeded.

10. In the switchgear cabinet monitoring arrangement in accordance with claim 8, wherein a common indicator element of the at least one indicator element monitors signals obtained from different sensors.

11. In the switchgear cabinet monitoring arrangement in accordance with claim 8, wherein an indicator state showing that the at least one threshold value is either upwardly or downwardly exceeded is maintained until reset.

12. In the switchgear cabinet monitoring arrangement in accordance with claim 8, wherein the at least one threshold value is stored in the fixed value memory of the control device and each is changed by keys arranged on the device housing, or by a connecting line from a remote position or by a radio.

13. In the switchgear cabinet monitoring arrangement in accordance with claim 8, wherein the monitoring signals are transmitted via either a connecting line or a radio to a location outside of the switchgear cabinet.

14. In the switchgear cabinet monitoring system in accordance with claim 8, wherein several switchgear cabinet monitoring arrangements are connected to a net and are linked to a higher monitoring position.

* * * * *